(12) United States Patent
Devitt (10) Patent No.: US 12,026,278 B2
(45) Date of Patent: Jul. 2, 2024

(54) SYSTEM AND METHOD FOR SECURING AND FACILITATING ACCESS TO A DIGITAL LEGACY

(71) Applicant: Digital Legacy AI, Inc., Holly Springs, NC (US)

(72) Inventor: Glenn W. Devitt, Holly Springs, NC (US)

(73) Assignee: DIGITAL LEGACY AI, INC., Holly Springs, NC (US)

( * ) Notice: Subject to any disclaimer, the term of this patent is extended or adjusted under 35 U.S.C. 154(b) by 261 days.

(21) Appl. No.: 17/690,894

(22) Filed: Mar. 9, 2022

(65) Prior Publication Data

US 2022/0292216 A1 Sep. 15, 2022

Related U.S. Application Data

(60) Provisional application No. 63/158,638, filed on Mar. 9, 2021.

(51) Int. Cl.
  *G06F 21/62* (2013.01)
(52) U.S. Cl.
  CPC ................................ *G06F 21/6245* (2013.01)
(58) Field of Classification Search
  CPC .......... G06F 21/30; G06F 21/33; G06F 21/60; G06F 21/62; G06F 21/6245; H04L 9/32
  See application file for complete search history.

(56) References Cited

U.S. PATENT DOCUMENTS

| | | | | |
|---|---|---|---|---|
| 7,802,724 B1* | 9/2010 | Nohr | .................. | G07C 9/28 235/384 |
| 11,146,564 B1* | 10/2021 | Ankam | .................. | H04L 63/102 |
| 11,405,400 B2* | 8/2022 | Gazit | .................. | H04L 43/0876 |
| 11,611,549 B2* | 3/2023 | Brown | .................. | H04L 63/0853 |
| 11,632,360 B1* | 4/2023 | Tan | .................. | G06F 3/0622 726/4 |
| 11,797,363 B2* | 10/2023 | Smith | .................. | G06F 16/9577 |
| 11,841,855 B2* | 12/2023 | Kumar | .................. | G06F 16/24539 |
| 2022/0103518 A1* | 3/2022 | LaChance | .................. | H04L 63/0236 |

* cited by examiner

Primary Examiner — Hosuk Song
(74) Attorney, Agent, or Firm — Akerman LLP (57) ABSTRACT

A system for securely storing personal information and memories of a user, such as through a software application, is disclosed. In particular, the system may utilize the application to transition the personal information and memories from cloud storage to cold storage and/or to an air-gapped data storage system. The personal information and memories of the user may be secured by the system using blockchain technology, multi-factor authentication, and/or other security technologies. The system may ensure that the information is highly secured until the user has passed and a next of kin of the user and/or other intended recipient of the user's information successfully authenticates with the system, such as by presenting a valid death certificate and/or acceptable credential. If the intended recipient of the data successfully provides a valid death certificate and/or credential, the intended recipient may be provided with access to the data associated with the user.

20 Claims, 3 Drawing Sheets

SYSTEM AND METHOD FOR SECURING AND FACILITATING ACCESS TO A DIGITAL LEGACY

CROSS REFERENCE TO RELATED APPLICATIONS AND PRIORITY

The present application claims priority to and the benefit of U.S. Provisional Patent Application No. 63/158,638, filed on Mar. 9, 2021, the entirety of which is hereby incorporated by reference.

FIELD OF THE INVENTION

The present application relates to data storage technologies, data security technologies, artificial intelligence technologies, machine learning technologies, cloud-computing technologies, and more particularly, to a system and method for securing and facilitating access to a digital legacy.

BACKGROUND

Currently, individuals regularly generate information and content in their daily lives. The generation of such information and content has been facilitated through the increased and regular use mobile applications, the internet, cloud-computing systems, and mobile devices. Such information and content may include, but is not limited to, video content, text content, audio content, virtual reality content, augmented reality content, digital documents, files, folders, financial information, information associated with possessions of an individual, life history information, medical information, job information, any information associated with an individual, metadata, or a combination thereof. So much information and content is being generated today that a significant portion of the content is not even generated by the individuals themselves. Nevertheless, individuals attempt to corral such data by utilizing cloud-computing accounts, which allow individual to upload some or all of their data into the cloud. Such cloud data may then be accessed by the individual on different devices and/or applications. Notably, however, when individuals pass away, their associated data and content are often left to sit in the cloud without others having access to such data and content.

As a result, there remains room for substantial enhancements to existing technologies and processes and for the development of new technologies and processes to facilitate the security and access to an individual's data at the occurrence of an event, such as the death of the individual. While currently existing technologies provide for various benefits, such technologies still come with various drawbacks and inefficiencies. For example, currently existing processes and technologies often do not have common rules or processes in place to transfer some or all of an individual's data to loved ones and/or trusted contacts. Additionally, current technologies rely on the use of username and password combinations and anyone with the username and password can access another user's information and content. Based on the foregoing, current technologies may be improved and enhanced so as to provide for more effective transfer of data to loved ones and/or trusted contacts, enhanced data security and integrity, standardized methods for transferring data upon the passing of an individual, and providing a central source for data associated with an individual. Such enhancements and improvements to methodologies and technologies may provide for enhanced data-sharing capabilities, enhanced legacy transfer capabilities, and improved compliance with an individual's wishes upon their passing.

SUMMARY

A system and accompanying methods for securely storing personal information and memories of a user, such as through a software application, are disclosed. In particular, the system may utilize the application to transition the personal information and memories from cloud storage to cold storage to an air-gapped data storage system, or vice versa. The personal information and memories of the user may be secured by the system using blockchain technology, multi-factor authentication, and/or other security technologies. The system may ensure that the information is highly secured until the user has passed and a next of kin of the user and/or other intended recipient of the user's information successfully authenticates with the system. Such a user may be authenticated by the system by presenting a valid death certificate and/or credential that is deemed acceptable by the system and/or the user that passed away. If the intended recipient of the data successfully provides a valid death certificate and/or credential, the intended recipient may be provided with access to the data associated with the user.

In one embodiment, a system for securing and facilitating access to a digital legacy is provided. The system may include a memory that stores instructions and a processor that executes the instructions to perform various operations of the system. The system may perform an operation that includes obtaining, such as by utilizing an application, data associated with a first user. The data associated with the first user may be any information associated with the first user, media content, video content, audio content, augmented reality content, virtual content, documents, files, folders, possessions, and/or anything associated with the first user. In certain embodiments, a portion of the data may indicate an authorized user intended to receive the data associated with the first user upon a passing of the first user. In certain embodiments, the indication of the authorized user may be provided via an input into the system, such as an input made by the first user or a trusted contact of the first user. The system may then perform an operation that includes storing, by utilizing the application, the data in a cloud-storage system, a cold storage system, an air-gapped data storage system, or a combination thereof. In certain embodiments, a cold storage system may be an offline system, a device not connected to the internet, a flash drive, any type of walled-off system or device, or a combination thereof. The system may secure the data by utilizing blockchain technology, multi-factor authentication, encryption techniques, and/or any other suitable methodologies for securing the data. Additionally, the system may perform an operation that includes generating, by utilizing the application, a story, collage, compilation, or a combination thereof, associated with the first user based on the data associated with the first user. The system may then perform an operation that includes determining whether the passing of the first user has occurred and whether a second user attempting to access the data associated with the first user is the authorized user. Moreover, the system may perform an operation that includes enabling the second user to access the data, story, compilation, and/or collage associated with the first user, if the second user is the authorized user and the second user has provided a death certificate of the first user that is valid, has provided an acceptable credential, or a combination thereof.

In another embodiment, a method for securing and facilitating access to a digital legacy is disclosed. The method may include a memory that stores instructions and a processor that executes the instructions to perform the functionality of the method. In particular, the method may include obtaining, by utilizing an application, data associated with a first user. The data may be obtained directly from the first user, via the internet, via data repositories, via third-party data aggregators, and/or any other information sources. In certain embodiments, a portion of the data may indicate an authorized user intended to receive the data associated with the first user, such as upon a passing of the first user. The method may also include storing, by utilizing the application, the data in a cloud-storage system, a cold storage system, an air-gapped data storage system, or a combination thereof. The data may be secured by utilizing blockchain technology, multi-factor authentication, encryption technologies, and/or other technologies for securing data. The method may include generating, by utilizing the application, a story, collage, compilation, or a combination thereof, associated with the first user based on the data associated with the first user. The method may proceed to include determining whether the passing of the first user has occurred and whether a second user attempting to access the data associated with the first user is an authorized user. Furthermore, the method may include enabling the second user to access the data associated with the first user, the story, the collage, the compilation, or a combination thereof, if the second user is the authorized user and the second user has provided a death certificate of the first user that is valid, has provided an acceptable credential, or a combination thereof.

According to yet another embodiment, a computer-readable device comprising instructions, which, when loaded and executed by a processor cause the processor to perform operations, the operations comprising: obtaining, by utilizing an application, data associated with a first user, wherein a portion of the data indicates an authorized user intended to receive the data associated with the first user upon a passing of the first user; storing, by utilizing the application, the data in a cloud-storage system, a cold storage system, an air-gapped data storage system, or a combination thereof; generating, by utilizing the application, a story, collage, compilation, or a combination thereof, associated with the first user based on the data associated with the first user; determining whether the passing of the first user has occurred; determining whether a second user attempting to access the data associated with the first user is the authorized user; and enabling the second user to access the data associated with the first user, the story, the collage, the compilation, or a combination thereof, if the second user is the authorized user and the second user has provided a death certificate of the first user that is valid, an acceptable credential, or a combination thereof.

These and other features of the systems and methods for securing and facilitating access to a digital legacy are described in the following detailed description, drawings, and appended claims.

DETAILED DESCRIPTION OF THE DRAWINGS

A system 100 and accompanying methods for securely storing personal information and memories of a user, such as through a software application, are disclosed. In particular, the system 100 may utilize the application to transition the personal information and memories from cloud storage to cold storage to an air-gapped data storage system, or vice versa. The personal information and memories of the user may be secured by the system using blockchain technology, multi-factor authentication, and/or other security technologies. In certain embodiments, the system 100 may generate a story, collage, and/or compilation using the data associated with the user so as to create and/or add to a digital legacy of the user. The system 100 may ensure that the information is highly secured until the user has passed and a next of kin of the user and/or other intended recipient of the user's information successfully authenticates with the system 100. Such a user may be authenticated by the system 100 by presenting a valid death certificate and/or credential that is deemed acceptable by the system and/or the user that passed away. If the intended recipient of the data successfully provides a valid death certificate and/or credential, the intended recipient may be provided with access to the data associated with the user.

Figure 1:
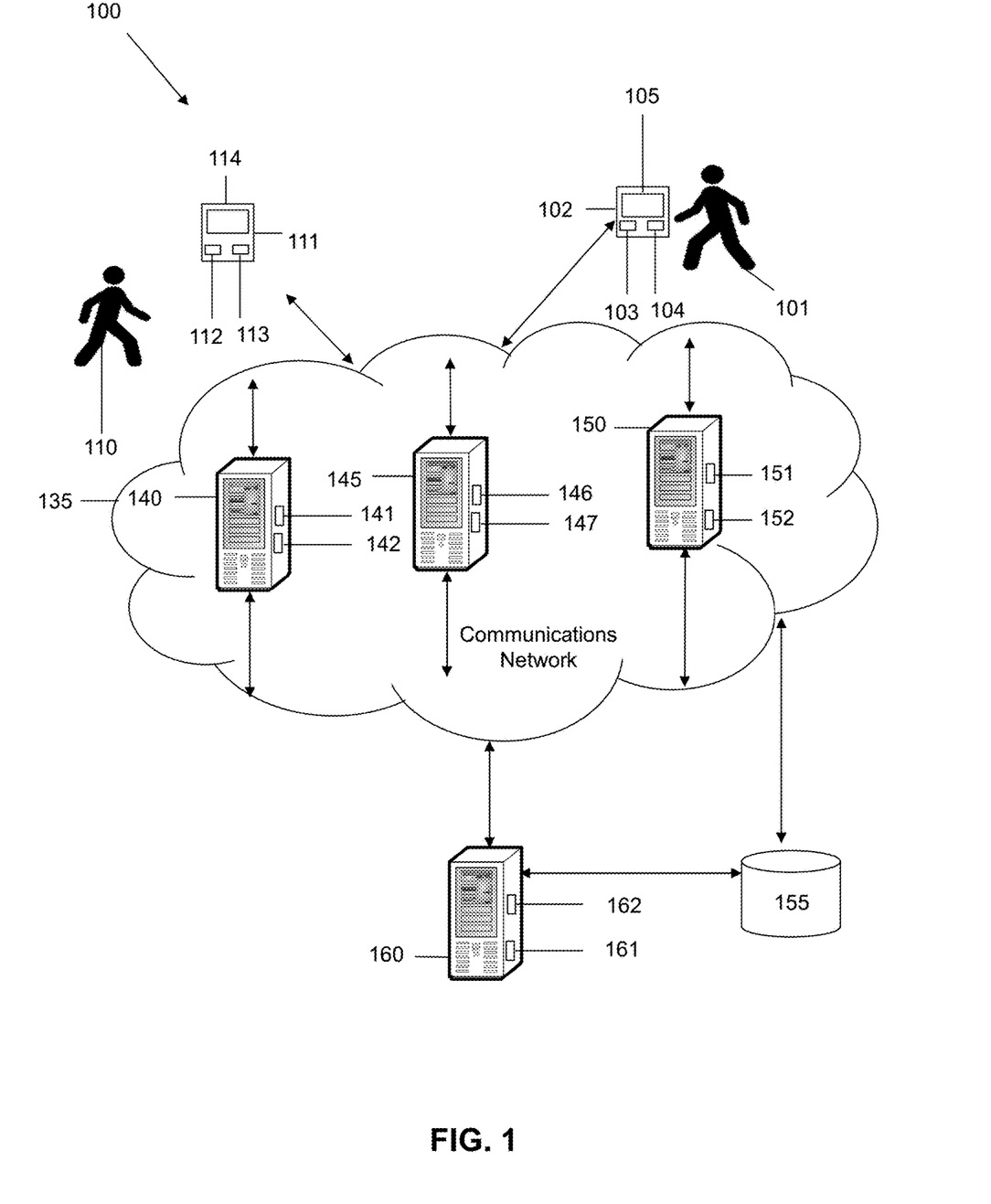
FIG. 1 is a schematic diagram of a system for securing and facilitating access to a digital legacy of a user according to an embodiment of the present disclosure.
Figure 2:
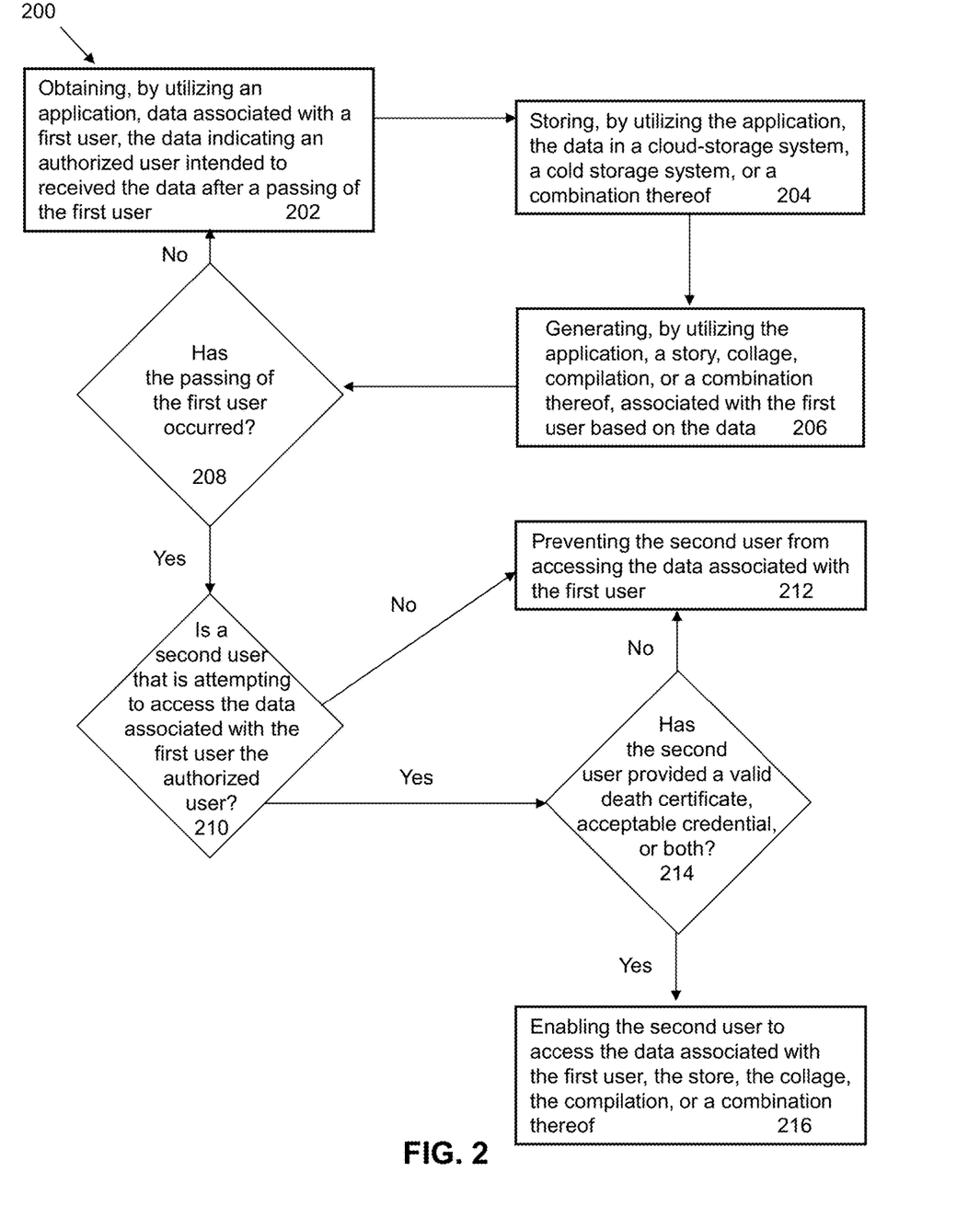
FIG. 2 is a flow diagram illustrating a sample method for securing and facilitating access to a digital legacy of a user according to an embodiment of the present disclosure.
Figure 3:
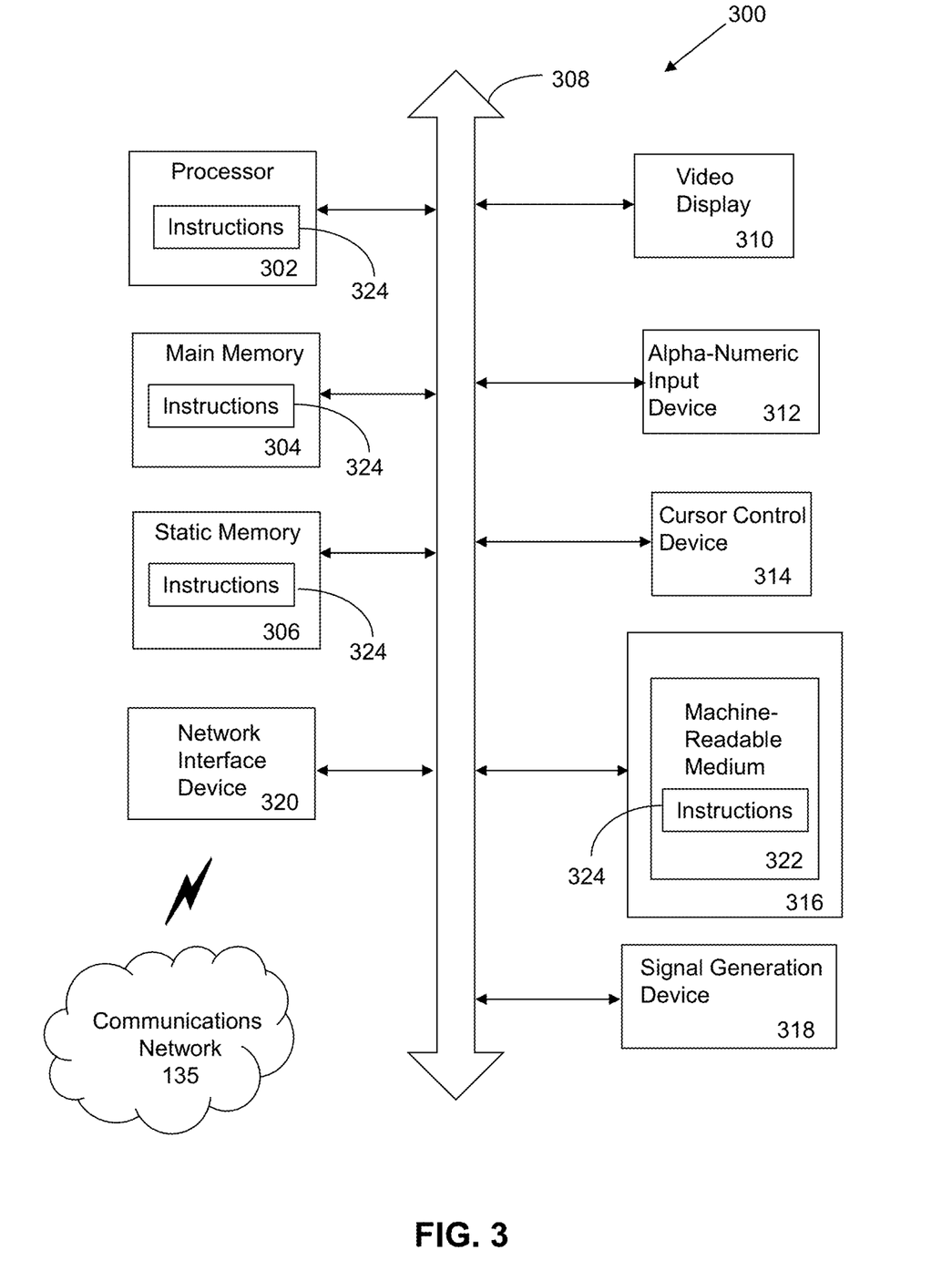
FIG. 3 is a schematic diagram of a machine in the form of a computer system within which a set of instructions, when executed, may cause the machine to secure and facilitate access to a digital legacy of a user.

As shown in FIG. 1 and referring also to FIGS. 2-3, a system 100 for securing and facilitating access to a digital legacy is disclosed. Notably, the system 100 may be configured to support, but is not limited to supporting, data gathering systems and services, data compilation systems and services, data encryption systems and services, data analytics systems and services, data collation and processing systems and services, medical systems and services, artificial intelligence services and systems, machine learning services and systems, content delivery services, surveillance and monitoring services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and/or any other computing applications and services. Notably, the system 100 may include a first user 101, who may utilize a first user device 102 to access data, content, and services, or to perform a variety of other tasks and functions. As an example, the first user 101 may utilize first user device 102 to transmit signals to access various online services and content, such as those available on an internet, on other devices, and/or on various computing systems. As another example, the first user device 102 may be utilized to access an application that provides the operative functions of the system 100. In certain embodiments, the first user 101 may be a person, a robot, a humanoid, a program, a computer, any type of user, or a combination thereof. The first user 101, for example, may be a person that wishes to pass on a digital legacy including information, documents, media content, possessions, and/or any information associated with the first user 101 to another user(s), such as after the first user 101 has passed away. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102 and to interact with the system 100. In certain embodiments, the first user device 102 may be and/or may include a computer, any type of sensor, a laptop, a set-top-box, a tablet device, a phablet, a server, a mobile device, a smartphone, a smart watch, and/or any other type of computing device. Illustratively, the first user device 102 is shown as a smartphone device in FIG. 1. In certain embodiments, the first user device 102 may be utilized by the first user 101 to control and/or provide some or all of the operative functionality of the system 100.

In addition to using first user device 102, the first user 101 may also utilize and/or have access to additional user devices. As with first user device 102, the first user 101 may utilize the additional user devices to transmit signals to access various online services and content. The additional user devices may include memories that include instructions, and processors that executes the instructions from the memories to perform the various operations that are performed by the additional user devices. In certain embodiments, the processors of the additional user devices may be hardware, software, or a combination thereof. The additional user devices may also include interfaces that may enable the first user 101 to interact with various applications executing on the additional user devices and to interact with the system 100. In certain embodiments, the first user device 102 and/or the additional user devices may be and/or may include a computer, any type of sensor, a laptop, a set-top-box, a tablet device, a phablet, a server, a mobile device, a smartphone, a smart watch, and/or any other type of computing device, and/or any combination thereof. Sensors may include, but are not limited to, motion sensors, pressure sensors, temperature sensors, light sensors, heart-rate sensors, blood pressure sensors, sweat detection sensors, breath-detection sensors, stress-detection sensors, any type of health sensor, humidity sensors, any type of sensors, or a combination thereof.

The first user device 102 and/or additional user devices may belong to and/or form a communications network. In certain embodiments, the communications network may be a local, mesh, or other network that enables and/or facilitates various aspects of the functionality of the system 100. In certain embodiments, the communications network may be formed between the first user device 102 and additional user devices through the use of any type of wireless or other protocol and/or technology. For example, user devices may communicate with one another in the communications network by utilizing any protocol and/or wireless technology, satellite, fiber, or any combination thereof. Notably, the communications network may be configured to communicatively link with and/or communicate with any other network of the system 100 and/or outside the system 100.

In certain embodiments, the first user device 102 and additional user devices belonging to the communications network may share and exchange data with each other via the communications network. For example, the user devices may share information relating to the various components of the user devices, information associated with images and/or content accessed by a user of the user devices, information associated with activities performed by the user, information and/or content associated with the user himself, information identifying the locations of the user devices, information indicating the types of sensors that are contained in and/or on the user devices, information identifying the applications being utilized on the user devices, information identifying how the user devices are being utilized by a user, information identifying user profiles for users of the user devices, information identifying device profiles for the user devices, information identifying the number of devices in the communications network, information identifying devices being added to or removed from the communications network, any other information, or any combination thereof.

In addition to the first user 101, the system 100 may also include a second user 110. The second user 110 may be a person that is related to the first user 101, a trusted contact of the first user 101, anyone that the first user 101 deems should receive the digital legacy of the first user 101, a robot, a device, a system, or a combination thereof. The second user device 111 may be utilized by the second user 110 to transmit signals to request various types of content, services, and data provided by and/or accessible by communications network 135 or any other network in the system 100. In further embodiments, the second user 110 may be a robot, a computer, a humanoid, an animal, any type of user, or any combination thereof. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. screen, monitor, graphical user interface, etc.) that may enable the first user 101 to interact with various applications executing on the second user device 111 and to interact with the system 100. In certain embodiments, the second user device 111 may be a computer, a laptop, a set-top-box, a tablet device, a phablet, a server, a mobile device, a smartphone, a smart watch, and/or any other type of computing device. Illustratively, the second user device 111 is shown as a mobile device in FIG. 1. In certain embodiments, the second user device 111 may also include sensors, such as, but are not limited to, motion sensors, pressure sensors, temperature sensors, light sensors, any type of sensors, or a combination thereof.

In certain embodiments, the first user device 102, the additional user devices, and/or the second user device 111 may have any number of software applications and/or application services stored and/or accessible thereon. For example, the first user device 102, the additional user devices, and/or the second user device 111 may include applications for controlling the operative features and functionality of the system 100, applications for controlling any device of the system 100, interactive social media applications, biometric applications, cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications may support the functionality provided by the system 100 and methods described in the present disclosure. In certain embodiments, the software applications and services may include one or more graphical user interfaces so as to enable the first and/or second users 101, 110 to readily interact with the software applications. The software applications and services may also be utilized by the first and/or second users 101, 110 to interact with any device in the system 100, any network in the system 100, or any combination thereof. In certain embodiments, the first user device 102, the additional user devices, and/or the second user device 111 may include associated telephone numbers, device identities, or any other identifiers to uniquely identify the first user device 102, the additional user devices, and/or the second user device 111.

The system 100 may also include a communications network 135. The communications network 135 may be under the control of a service provider, the first user 101, the second user 110, any other designated user, a computer, another network, or a combination thereof. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry. The communications network 135 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. The servers 140, 145, and 150 may provide and serve as a server service that performs the various operations and functions provided by the system 100. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to the servers 140, 145, 150, 160, the first user device 102, the second user device 111, the additional user devices, any devices in the system 100, any process of the system 100, any program of the system 100, any other device, any network, or any combination thereof.

The database 155 may also store information and metadata obtained from the system 100, store metadata and other information associated with the first and second users 101, 110, store data obtained from devices associated with deceased and/or living users, stored media content, store video content, store audio content, store augmented reality content, store virtual reality content, store digital documents, store files, store folders, store a user's digital legacy (which may include all content, information, possessions, and/or data associated with a particular user), store online identities associated with deceased and/or living users, store information obtained from third-party data aggregators associated with deceased and/or living users, store models generated by the system 100, store information for updating the models, store user profiles associated with the first and second users 101 and/or having correlation with other users and/or deceased users, store device profiles associated with any device in the system 100, store communications traversing the system 100, store user preferences, store information associated with any device or signal in the system 100, store information relating to patterns of usage relating to the user devices 102, 111, store any information obtained from any of the networks in the system 100, store historical data associated with the first and second users 101, 110, store device characteristics, store information relating to any devices associated with the first and second users 101, 110, store information associated with the communications network 135, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

Operatively, the system 100 (and the method 200) may be configured to accommodate and work with any number of use-case scenarios. In an exemplary use case scenario, the system 100 may be utilized to secure and facilitate access to a digital legacy of a user, such as first user 101. In certain embodiments, the first user 101 may download an application supporting the functionality of the system 100 onto first user device 102, which may be a smartphone or other device. A user interface featuring the functionality of the application may be rendered and displayed on an interface 105 (e.g. display screen) of the first user device 102 so that the first user 101 may interact with the application using the first user device 102. The first user 101 may be provided with the ability to generate an account with the application. When creating the account, the first user 101 may input a username, passcode, contact information (e.g. email, address, phone number, etc.), demographic information, personal information, preferences associated with data associated with the first user 101, data, media content, text content, audio content, any type of content, files, folders, links to content and/or data, an identification of locations of data and content of the first user 101, biographical information, educational information, life history information, financial information, a trust contact list, a list of users, devices, systems, and/or programs authorized to access data and/or content associated with the first user 101, information relating to devices owned by and/or associated with the first user 101, any other information, or a combination thereof. Once the first user 101 has input the information and/or content, the system 100 may generate the account for the first user 101. The system 100 may enable the first user 101 to update the first user's account whenever he wants via the application.

Once the system 100 has created the account for the first user 101, the system 100 may store uploaded data and content into a cloud-storage system, cold-storage system, an air-gapped data storage system, or a combination thereof. In certain embodiments, the application and/or system 100 may also store uploaded data and content via air-gapped data storage, which may store the data and content so that the data and content are no longer connected to the internet or to communications networks. If the first user 101 did not directly upload content and data into the application, but instead provided links or information identifying the locations of data and content of the user, the application may access the links and/or connect with devices, programs, and/or networks to obtain the content and data associated with the first user 101 using the links and/or location information. In certain embodiments, the application may access such information and content via APIs that allow the application to interface with different device, programs, and/or systems. In certain embodiments, the application may interface with third-party data aggregators, which may have gathered data across the internet that is associated with the first user 101, so that content and data accumulated by such aggregators may be obtained via the application. The application may continuously (or at a schedule or at random) obtain additional content and data associated with the first user 101 as time passes and/or as the first user 101 makes changes to his account and/or information associated with the account. In certain embodiments, an artificial intelligence and/or machine learning component of the application and/or system 100 may analyze the content and data associated with the first user 101 and may generate a story, collage, compilation, or a combination hereof, associated with the first user 101. For example, the artificial intelligence component may organize the content according to timestamps contained in metadata of the data and content to create a chronological life history of the first user 101, analyze the concepts contained in the content itself (e.g. by using a natural language system or analysis tool to analyze text and/or content) and organize the content according to topic, analyze the type of content and organize the content according the type of content, organize the content according to the first user's 101 preferences, compile the content and data in any way, or a combination thereof. The user's account and/or content and data associated with the account may form the first user's 101 digital legacy, which the first user 101 may leave to trusted contacts and/or authorized users, devices, and/or systems, such as after the first user's 101 passing.

The first user 101 may pass away and the system 100 (e.g. via the application) may receive a verification of the first user's 101 passing via an input from a trusted contact into the application, by receiving a notification from a family member, by receiving a notification from a funeral home, by receiving a notification from the first user's 101 place of employment, by receiving a digital copy of a the first user's 101 death certificate, by receiving any other type of indication, or a combination thereof. In the event that the first user 101 has passed away, the application may enable trusted contacts, authorized users, and/or authorized devices, systems, and/or programs to access the account of the first user 101. For example, a second user, such as second user 110 may attempt to access the account including the data and content associated with the first user 101. The second user 110 may do so by accessing the application via second user device 111. The second user 110 may attempt to directly log into the first user's 101 account. When the second user 110 attempts to do so, the application may receive inputs from the second user 110 that identify the second user 110 to the application, such as a name, username, password, multifactor authentication, unique sequence of characters, address, a photo, video content, media content, a biometric identifier, any type of identifier that may be utilized to identify the second user, or a combination thereof. Based on an analysis of the information that the second user 110 inputs into the application, the application may compare the information to the information contained in the first user's 101 account to determine if the second user 110 is an authorized user. If not, the application may prevent the second user 110 from accessing the first user's 101 account. If the second user 110 is an authorized user, but the first user 101 is still alive, the application may prevent the second user 110 from accessing the account as well depending on the first user's 101 preference.

If, however, the second user 110 is determined to be an authorized user by the application, the application may then request a valid death certificate of the first user 101 from the second user 110, another acceptable credential, or a combination thereof. If the application requires the valid death certificate only and the second user 110 uploads a death certificate into the application, the application may determine whether or not the death certificate is authentic by comparing the uploaded death certificate to a known-to-be-valid death certificate that the application received after the first user's 101 passing and/or to other information that the application received after the first user's 101 passing. If the application determines that the death certificate uploaded by the second user 110 is invalid, the application may block the second user 110 from accessing the first user's 101 account, data, and/or content. If, however, the death certificate uploaded by the second user 110 is determined to be valid, the application may enable the second user 110 to access the digital legacy of the first user 101, such as by providing access to the first user's 101 account. In certain embodiments, instead of or in addition to providing a valid death certificate, the application may require some other credential to be input by the second user 110 to gain access to the first user's 101 account. For example, the other credential may be an additional biometric identifier, a unique passphrase specified by the first user 101 in the first user's account, a unique sequence of characters, a unique hash, a unique digital key, a unique data upload, a unique text upload, a unique media content upload, a unique multi-factor authentication credential, a unique image, a quick response code, a unique captcha sequence, any type of credential, or a combination thereof. In certain embodiments, the additional credential may be specified by the first user 101, a trusted contact of the first user 101, by the application, or a combination thereof. If the second user 110 successfully inputs the required additional credential, the application may provide the second user 110 with access to the first user's 101 account, the story, the collage, the compilation, or a combination thereof. Otherwise, the second user 110 may be blocked from accessing the first user's 101 account and/or digital legacy. In certain embodiments, the first user 101 may have specified a specific amount of content or type of content that a particular authorized user may access upon successful authentication through the application. For example, one authorized user may have access to all of the first user's 101 digital legacy, whereas another authorized user may only have access to a subset of the first user's 101 digital legacy. In certain embodiments, the first user 101 may also specify whether the content and data may be copied by an authorized user, whether the content and data may be transmitted to another user and/or device, whether the content and data may be accessed by a particular device, program, and/or system, whether the content and data may be modified, whether the content and data may be saved, and/or anything else can be done with respect to the content and data. The application may allow the first user 101 to exert full or some control over what an authorized user can do with the first user's 101 content and data contained in the first user's digital legacy, even after the first user's 101 passing.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, obtaining data associated with a first user that wishes to leave a digital legacy to another or others; storing the data in a cloud-storage system, a cold-storage system, an air-gapped data storage system, or a combination thereof; generating a story, collage, and/or compilation associated with the first user; determining whether the first user has passed; determining whether a second user attempting to access the data associated with the first user is an authorized user; determining whether the second user has provided a valid death certificate, acceptable credential, or both; providing access to the second user to the first user's data if the second user is authorized and/or has provided a valid death certificate and/or acceptable credential; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-3 illustrates specific example configurations of the various components of the system 100, the system 100 may include any configuration of the components, which may include using a greater or lesser number of the components. For example, the system 100 is illustratively shown as including a first user device 102, a second user device 111, a communications network 135, a server 140, a server 145, a server 150, a server 160, and a database 155. However, the system 100 may include multiple first user devices 102, multiple second user devices 111, multiple communications networks 135, multiple servers 140, multiple servers 145, multiple servers 150, multiple servers 160, multiple databases 155, or any number of any of the other components inside or outside the system 100. Furthermore, in certain embodiments, substantial portions of the functionality and operations of the system 100 may be performed by other networks and systems that may be connected to system 100.

Notably, the system 100 may execute and/or conduct the functionality of the present disclosure as described in the method(s) that follow. As shown in FIG. 2, an exemplary method 200 for securing and facilitating access to a digital legacy of a user is schematically illustrated. The method 200 and/or functionality and features supporting the method 200 may be conducted via an application of the system 100, devices of the system 100, processes of the system 100, any component of the system 100, or a combination thereof. In certain embodiments, the steps of the method 200 may be done in any desired order and are not intended to be limited to the specific sequence of steps shown in FIG. 2. The method 200 may include steps for obtaining and analyzing data associated with a first user, storing the data, generating a story, collage, and/or compilation based on the data associated with the first user, determining whether the first user has passed away, determining whether a second user is authorized to access the first user's data after the first user has passed away, and providing access to the data of the first user to the second user if the second user has provided a valid death certificate and/or acceptable credential. At step 202, the method 200 may include obtaining data associated with a first user, such as first user 101. The data may be obtained by an application, a device, a robot, a process, any type of system, or a combination thereof. Some or all of the data associated with the first user may comprise the first user's digital legacy, such as in the event that the legacy is to be provided to another upon the first user's passing. In certain embodiments, the data itself may include video content, audio content, media content, augmented reality content, virtual reality content, text content, documents, information associated with possessions of the first user, financial information, historical information, demographic information, any information about the first user, any type of data, or a combination thereof. In certain embodiments, the data associated with the first user or the first user himself may indicate an authorized user(s), device(s), system(s), or a combination thereof, that may access the data associated with the first user upon the first user's passing and upon providing a valid death certificate and/or acceptable credential. In certain embodiments, the data associated with the first user may be secured using blockchain technology, multi-factor authentication technologies, encryption technologies, black box technologies, any type of security technology, or a combination thereof. In certain embodiments, the obtaining of the data associated with the first user may be performed and/or facilitated by utilizing the first user 101, the second user 110 and/or by utilizing the first user device 102, the second user device 111, the server 140, the server 145, the server 150, the server 160, the communications network 135, any combination thereof, or by utilizing any other appropriate program, network, system, or device.

At step 204, the method 200 may include storing, such as by utilizing an application, the data associated with the first user in a cloud-storage system, a cold-storage system (or device), an air-gapped data storage system, or a combination thereof. In certain embodiments, the storing of the data associated with the first user may be performed and/or facilitated by utilizing the first user 101, the second user 110 and/or by utilizing the first user device 102, the second user device 111, the server 140, the server 145, the server 150, the server 160, the communications network 135, any combination thereof, or by utilizing any other appropriate program, network, system, or device. At step 206, the method 200 may include generating, such as by utilizing the application of the system 100, a story, collage, compilation, or a combination thereof, associated with the first user based on the data obtained for the first user. For example, the story, collage, and/or compilation may be created by the system 100 chronologically arranging the data according to a timestamp on each portion of data in the dataset associated with the first user. In such a scenario, the story may provide a chronological story of the life of the first user over time. As another example, the story, collage, and/or compilation may be created based on the system 100 detecting specific subject matter topics within the data and organizing the data based on the subject matter topics. As a further example, the story, the collage, and/or the compilation may be generated by organizing subsets of the data based on the data within a particular subset having a threshold level of correlation with other data in the subset, having a pattern in common with other data in the subset, having any relating to other data in the subset, based on any desired metric, parameter, and/or filter, or a combination thereof. In certain embodiments, the generating of the story, the collage, and/or the compilation may be performed and/or facilitated by utilizing the first user 101, the second user 110 and/or by utilizing the first user device 102, the second user device 111, the server 140, the server 145, the server 150, the server 160, the communications network 135, any combination thereof, or by utilizing any other appropriate program, network, system, or device. In certain embodiments, the data associated with the first user, the story, the compilation, the collage, or a combination thereof, may be stored within an account associated with the first user that is stored in the system 100.

At step 208, the method 200 may include determining if the first user has passed away. The system 100 may determine that the first user has passed away based on analyzing the internet and locating information indicative of and/or validating the first user's death, based on receiving an input indicating the passing of the first user by a trusted contact of the first user, based on receiving information from a funeral home, based on receiving information from a family member, based on receiving a digital or other version of a death certificate of the first user, based on detecting that a specific device and/or system associated with the first user is no longer active, based on a specific event occurring (e.g. an event specified by the first user), based on other methodologies, or a combination thereof. In certain embodiments, the determining of whether the first user has passed away may be performed and/or facilitated by utilizing the first user 101, the second user 110 and/or by utilizing the first user device 102, the second user device 111, the server 140, the server 145, the server 150, the server 160, the communications network 135, any combination thereof, or by utilizing any other appropriate program, network, system, or device. If the first user has been determined to not have passed, the method 200 may revert back to 202 and continue to obtain data associated with the first user. If, however, the first user has been determined to have passed away, the method 200 may proceed to step 210. At step 210, the method 200 may include determining whether a second user (e.g. second user 110) that is attempting to access the data associated with the first user is the authorized user. The determination may be made by the second user submitting information verifying the second user's identity, by the second user submitting a certain multi-factor authentication information/credential, by the second user submitting biometric information, by any other verification methodology, or a combination thereof. In certain embodiments, the determining may be performed and/or facilitated by utilizing the first user 101, the second user 110 and/or by utilizing the first user device 102, the second user device 111, the server 140, the server 145, the server 150, the server 160, the communications network 135, any combination thereof, or by utilizing any other appropriate program, network, system, or device.

If the determining indicates that the second user is not an authorized user specified by the first user, the method 200 may proceed to step 212, which may include preventing the second user from accessing the data associated with the first user. In certain embodiments, the preventing of access to the data may be performed and/or facilitated by utilizing the first user device 102, the second user device 111, the server 140, the server 145, the server 150, the server 160, the communications network 135, any combination thereof, or by utilizing any other appropriate program, network, system, or device. If, however, at step 210, the determining indicates that the second user is an authorized user, the method 200 may proceed to step 214. At step 214, the method 200 may include determining if the second user has provided a valid death certificate, an acceptable credential, or a combination thereof. The method 200 may include determining that the second user has provided a valid death certificate by comparing the death certificate submitted by the second user to a known-to-be valid death certificate, based on analyzing information in the death certificate itself, based on receiving a verification from an issuer of the death certificate, based on other methodologies, or a combination thereof. The acceptable credential may be a credential provided beyond the information provided in step 210, and may include, but is not limited to, biometric information, a unique passcode sequence, a digital key, unique information for decrypting a hash utilized by the system 100, any other credential, or a combination thereof. In certain embodiments, both the death certificate and the acceptable credential need to be provided, however, in certain embodiments, one or the other may be provided. In certain embodiments, the determining may be performed and/or facilitated by utilizing the second user 110 and/or by utilizing the first user device 102, the second user device 111, the server 140, the server 145, the server 150, the server 160, the communications network 135, any combination thereof, or by utilizing any other appropriate program, network, system, or device.

If, at step 214, the second user has not provided a death certificate that is valid and/or an acceptable credential, the method 200 may proceed to step 212. At step 212, the method 200 may include preventing the second user from accessing the data, story, compilation, and/or collage associated with the first user. If, however, at step 214, the system 100 determines that the second user has provided a death certificate that is valid and/or the acceptable credential, the method 200 may proceed to step 216. At step 216, the method 200 may include enabling the second user to access the data, the story, the compilation, and/or the collage associated with the first user. The access may be provided via the application of the system 100, via a data download, via a streaming session, via other methodologies, or a combination thereof. In certain embodiments, if there is non-digital information associated with the first user, the method 200 may include providing information and/or directions to the second user so as to access the non-digital information. Such non-digital information may include possessions of the first user, documents of the first user, any other non-digital information, or a combination thereof. In certain embodiments, the method 200 may have different levels of authorized users. For example, certain authorized users may have access to all of the data associated with the first user. Other authorized users may only have access to a subset of the data associated with the first user. In certain embodiments, the authorized users may change based on time, preferences made by the first user, the occurrence of events, and/or other triggers. Notably, the method 200 may further incorporate any of the features and functionality described for the system 100, any other method disclosed herein, or as otherwise described herein.

The systems and methods disclosed herein may include additional functionality. In certain embodiments, the system and methods may include an option for users to generate a smart contract may run on a blockchain platform of the system 100 and/or another system communicatively linked to the system 100. The smart contract may provide users with the ability to designate who the users want as their guardian of their digital legacy, which may include, but is not limited to, digital media, personal belongings, etc. In certain embodiments, smart contracts may be defined as programs that may be stored on a blockchain that may run when predetermined conditions are met, such as a death of a user, illness, and the like. In certain embodiments, smart contracts may be utilized to automate the execution of an agreement so that all participants associated with the agreement may be immediately certain of outcome, without any intermediary's involvement or time loss. For example, upon the death of an individual, the smart contract may automatically trigger distribution of the individuals belongings to a designated individual.

The systems and methods disclosed herein may include still further functionality and features. For example, the operative functions of the system 100 and method may be configured to execute on a special-purpose processor specifically configured to carry out the operations provided by the system 100 and method. Notably, the operative features and functionality provided by the system 100 and method may increase the efficiency of computing devices that are being utilized to facilitate the functionality provided by the system 100 and the various methods discloses herein. For example, by training the system 100 over time based on data and/or other information provided and/or generated in the system 100, a reduced amount of computer operations may need to be performed by the devices in the system 100 using the processors and memories of the system 100 than compared to traditional methodologies. In such a context, less processing power needs to be utilized because the processors and memories do not need to be dedicated for processing. As a result, there are substantial savings in the usage of computer resources by utilizing the software, techniques, and algorithms provided in the present disclosure. In certain embodiments, various operative functionality of the system 100 may be configured to execute on one or more graphics processors and/or application specific integrated processors.

Notably, in certain embodiments, various functions and features of the system 100 and methods may operate without any human intervention and may be conducted entirely by computing devices. In certain embodiments, for example, numerous computing devices may interact with devices of the system 100 to provide the functionality supported by the system 100. Additionally, in certain embodiments, the computing devices of the system 100 may operate continuously and without human intervention to reduce the possibility of errors being introduced into the system 100. In certain embodiments, the system 100 and methods may also provide effective computing resource management by utilizing the features and functions described in the present disclosure. For example, in certain embodiments, devices in the system 100 may transmit signals indicating that only a specific quantity of computer processor resources (e.g. processor clock cycles, processor speed, etc.) may be devoted to generating the story, the compilation, and/or the collage, providing access to a specific user's data and content, hosting the user's data and content, and/or performing any other operation conducted by the system 100, or any combination thereof. For example, the signal may indicate a number of processor cycles of a processor may be utilized to generate a story, and/or specify a selected amount of processing power that may be dedicated to any of the operations performed by the system 100. In certain embodiments, a signal indicating the specific amount of computer processor resources or computer memory resources to be utilized for performing an operation of the system 100 may be transmitted from the first and/or second user devices 102, 111 to the various components of the system 100.

In certain embodiments, any device in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected value. In certain embodiments, the system 100 and methods may include transmitting signals to the memory devices utilized in the system 100, which indicate which specific sections of the memory should be utilized to store any of the data utilized or generated by the system 100. Notably, the signals transmitted to the processors and memories may be utilized to optimize the usage of computing resources while executing the operations conducted by the system 100. As a result, such functionality provides substantial operational efficiencies and improvements over existing technologies.

Referring now also to FIG. 3, at least a portion of the methodologies and techniques described with respect to the exemplary embodiments of the system 100 can incorporate a machine, such as, but not limited to, computer system 300, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100. As another example, the computer system 300 may assist with securely storing personal information and memories of a user into one or more applications and/or systems. As yet another example, the computer system 300 may assist with transitioning personal information back and forth between a cloud-computing system and/or a cold storage device and/or an airgapped data storage system and/or various components of the system 100. As a further example, the computer system 300 may assist with authenticating an individual(s) that is intended to receive the personal information, such as upon the death of a user associated with the personal information.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 145, the server 150, the database 155, the server 160, any other system, program, and/or device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310, which may be, but is not limited to, a liquid crystal display (LCD), a flat panel, a solid-state display, or a cathode ray tube (CRT). The computer system 300 may include an input device 312, such as, but not limited to, a keyboard, a cursor control device 314, such as, but not limited to, a mouse, a disk drive unit 316, a signal generation device 318, such as, but not limited to, a speaker or remote control, and a network interface device 320.

The disk drive unit 316 may include a machine-readable medium 322 on which is stored one or more sets of instructions 324, such as, but not limited to, software embodying any one or more of the methodologies or functions described herein, including those methods illustrated above. The instructions 324 may also reside, completely or at least partially, within the main memory 304, the static memory 306, or within the processor 302, or a combination thereof, during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 322 containing instructions 324 so that a device connected to the communications network 135, another network, or a combination thereof, can send or receive voice, video or data, and communicate over the communications network 135, another network, or a combination thereof, using the instructions. The instructions 324 may further be transmitted or received over the communications network 135, another network, or a combination thereof, via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A system, comprising:
a memory that stores instructions; and
a processor that executes the instructions to perform operations, the operations comprising:
obtaining, by utilizing an application, data associated with a first user, wherein a portion of the data associated with the first user indicates an authorized user intended to receive the data associated with the first user upon a passing of the first user;
storing, by utilizing the application, the data associated with the first user in a cloud-storage system, a cold storage system, an air-gapped data storage system, or a combination thereof;
generating, by utilizing the application, a story, collage, compilation, or a combination thereof, associated with the first user based on the data associated with the first user;
determining whether the passing of the first user has occurred;
determining whether a second user attempting to access the data associated with the first user is the authorized user; and
enabling the second user to access the data associated with the first user, the story, the collage, the compilation, or a combination thereof, if the second user is the authorized user and the second user has provided a death certificate of the first user that is valid, an acceptable credential, or a combination thereof.

2. The system of claim 1, wherein the operations further comprise generating the story, the collage, the compilation, or a combination thereof, by utilizing an artificial intelligence model.

3. The system of claim 1, wherein the operations further comprise generating the story, the collage, the compilation, or a combination thereof, by chronologically ordering data in the data associated with the first user, grouping subsets of the data based on data type, grouping subsets of the data based on content type, or a combination thereof.

4. The system of claim 1, wherein the data associated with the first user comprises information associated with the first user, video content associated with the first user, audio content associated with the first user, augmented reality content associated with the first user, virtual reality content associated with the first user, text associated with the first user, activity data associated with the first user, historical data associated with the first user, demographic information associated with the first user, family information associated with the first user, a social media post, a direct message, online account information, search history, website history, blog information, forum information, activity conducted on a mobile application, activity conducted on a device, a text message, documents associated with the first user, gaming profiles and history associated with the first user, any information, or a combination thereof.

5. The system of claim 1, wherein the operations further comprise determining whether the data associated with the first user is to be stored in the cloud-storage system, the cold storage system, the air-gapped data storage system, or a combination thereof, based on a preference of the first user.

6. The system of claim 1, wherein the operations further comprise securing the data associated with the first user, the story, the collage, the compilation, or a combination thereof, by utilizing blockchain technology, multi-factor authentication, or a combination thereof.

7. The system of claim 1, wherein the operations further comprise storing the data associated with the first user, the story, the collage, the compilation, or a combination thereof, in an account associated with the first user.

8. The system of claim 7, wherein the operations further comprise providing the account to the second user if the second user is the authorized user and the second user has provided the death certificate that is valid, the acceptable credential, or both.

9. The system of claim 1, wherein the operations further comprise preventing the second user from accessing the data associated with the first user, the story, the collage, the compilation, or a combination thereof, if the second user is not the authorized user.

10. The system of claim 1, wherein the operations further comprise preventing the second user from accessing the data associated with the first user, the story, the collage, the compilation, or a combination thereof, if the death certificate is not valid or if the death certificate is not provided.

11. The system of claim 1, wherein the operations further comprise preventing the second user from accessing the data associated with the first user, the story, the collage, the compilation, or a combination thereof, if the first user has not passed.

12. The system of claim 1, wherein the operations further comprise changing the authorized user based on a preference received by the first user.

13. A method, comprising:
obtaining, by utilizing an application, data associated with a first user, wherein a portion of the data associated with the first user indicates an authorized user intended to receive the data associated with the first user upon a passing of the first user;
storing, by utilizing the application, the data associated with the first user in a cloud-storage system, a cold storage system, an air-gapped data storage system, or a combination thereof;
generating, by utilizing the application and by utilizing instructions from a memory that are executed by a processor, a story, collage, compilation, or a combination thereof, associated with the first user based on the data associated with the first user;
determining whether the passing of the first user has occurred;

determining whether a second user attempting to access the data associated with the first user is the authorized user; and enabling the second user to access the data associated with the first user, the story, the collage, the compilation, or a combination thereof, if the second user is the authorized user and the second user has provided a death certificate of the first user that is valid, an acceptable credential, or a combination thereof.

14. The method of claim 13, further comprising determining that the death certificate is valid by comparing the death certificate to a known valid death certificate of the first user.

15. The method of claim 13, further comprising securing the data associated with the first user, the story, the collage, the compilation, or a combination thereof, by utilizing blockchain technology, multi-factor authentication, or a combination thereof.

16. The method of claim 13, further comprising streaming the story, the collage, the compilation, or a combination thereof, to a device of the second user if the second user has provided the death certificate that is valid, the acceptable credential, or a combination thereof.

17. The method of claim 13, further comprising modifying or adding to the data associated with the first user, the story, the collage, the compilation, or a combination thereof, as additional data associated with the first user is generated by the first user while the first user is alive, generated after the first user has passed, replaces previous inaccurate data associated with the first user, or a combination thereof.

18. The method of claim 13, further comprising preventing the second user from accessing the data associated with the first user if the passing of the first user has not occurred.

19. The method of claim 13, further comprising enabling the first user to specify that a portion of the data associated with the first user may be accessed by another authorized user.

20. A computer-readable device comprising instructions, which, when loaded and executed by a processor, cause the processor to perform operations, the operations comprising:

obtaining, by utilizing an application, data associated with a first user, wherein a portion of the data associated with the first user indicates an authorized user intended to receive the data associated with the first user upon a passing of the first user;

storing, by utilizing the application, the data associated with the first user in a cloud-storage system, a cold storage system, an air-gapped data storage system, or a combination thereof;

generating, by utilizing the application, a story, collage, compilation, or a combination thereof, associated with the first user based on the data associated with the first user;

determining whether the passing of the first user has occurred;

determining whether a second user attempting to access the data associated with the first user is the authorized user; and enabling the second user to access the data associated with the first user, the story, the collage, the compilation, or a combination thereof, if the second user is the authorized user and the second user has provided a death certificate of the first user that is valid, an acceptable credential, or a combination thereof.

\* \* \* \* \*